United States Patent [19]
Roossien

[11] Patent Number: 5,848,855
[45] Date of Patent: Dec. 15, 1998

[54] SHIFTER COVER ARRANGEMENT

[75] Inventor: Robert W. Roossien, Grand Haven, Mich.

[73] Assignee: Grand Haven Stamped Products Division of JSJ Corporation, Grand Haven, Mich.

[21] Appl. No.: 847,685

[22] Filed: Apr. 28, 1997

[51] Int. Cl.[6] .................................................. G01D 11/24
[52] U.S. Cl. ...................... 403/329; 403/326; 74/473.3
[58] Field of Search .................................. 403/329, 326, 403/105, 10, 289, 290; 74/473.3; 116/28.1, DIG. 20; 180/346

[56] References Cited

U.S. PATENT DOCUMENTS

| | | |
|---|---|---|
| 3,472,404 | 10/1969 | Ross . |
| 3,473,404 | 10/1969 | Ross ...................................... 74/473.3 |
| 4,446,809 | 5/1984 | Dennis . |
| 4,712,341 | 12/1987 | Harris, Jr. et al. . |
| 4,865,501 | 9/1989 | Ferris . |
| 4,964,359 | 10/1990 | Richmond . |
| 4,980,803 | 12/1990 | Richmond et al. . |
| 5,186,069 | 2/1993 | Asano et al. . |
| 5,289,621 | 3/1994 | Kaneko . |
| 5,339,501 | 8/1994 | Gugle et al. . |
| 5,372,415 | 12/1994 | Tisbo et al. . |
| 5,417,126 | 5/1995 | DeCrouppe et al. . |
| 5,505,103 | 4/1996 | Nordstrom et al. . |
| 5,540,180 | 7/1996 | Kataumi et al. . |
| 5,560,253 | 10/1996 | Ishikawa et al. . |
| 5,566,582 | 10/1996 | Beadle et al. . |
| 5,582,073 | 12/1996 | Takeuchi et al. ...................... 116/28.1 |
| 5,623,124 | 4/1997 | Chien ...................................... 403/105 |

FOREIGN PATENT DOCUMENTS

| | | |
|---|---|---|
| 0279087A1 | 8/1988 | European Pat. Off. . |
| 4429972C1 | 12/1995 | Germany . |
| 61-239313A | 10/1986 | Japan ........................................ 74/493 |
| 6137425A | 5/1994 | Japan ............................. 116/DIG. 20 |
| 709413 | 1/1980 | Russian Federation ................. 74/566 |

*Primary Examiner*—Anthony Knight
*Assistant Examiner*—John R. Cottingham
*Attorney, Agent, or Firm*—Price, Heneveld, Cooper, DeWitt & Litton

[57] ABSTRACT

A cover arrangement is provided for covering a transmission shifter for a vehicle. The cover arrangement includes a lower cover member and an upper cover that mates with the lower cover. The lower cover has a perimeter flange forming a recess, and the upper cover is configured to fit into the perimeter recess. The lower perimeter flange includes a plurality of integrally formed apertures having a tooth on one side and a pressure tab on the other side. The upper cover includes a plurality of integrally formed protrusions shaped to extend into the apertures. Each protrusion has a rough surface on one side for engaging the tooth of the aperture corresponding thereto, and a relatively smooth surface on another side for slidably engaging the pressure tab of the aperture corresponding thereto, the rough surface and the smooth surface being substantially parallel. Each respective protrusion, pressure tab and tooth is related and configured so that the respective pressure tab presses the respective protrusion into engagement with the respective tooth with a predetermined constant force, thereby creating a desired force of engagement regardless of the depth of engagement of each respective protrusion into the respective aperture. Also, the upper cover can be installed and reinstalled on the bottom cover member without concern over the retention strength, depth of engagement, or wear.

31 Claims, 7 Drawing Sheets

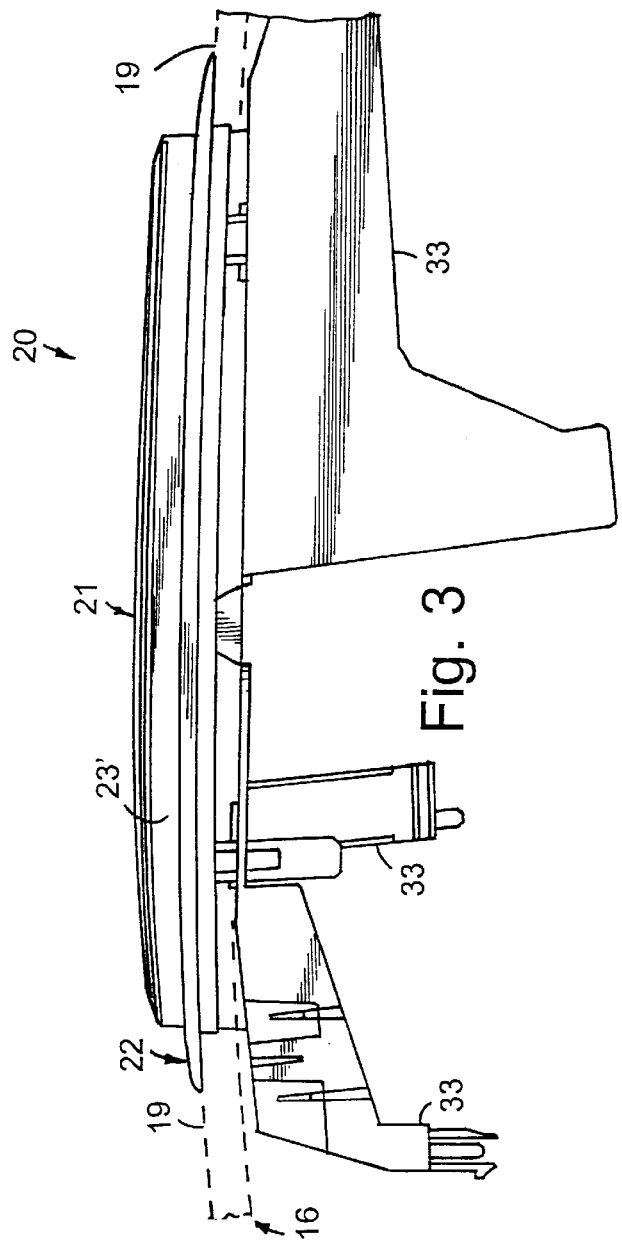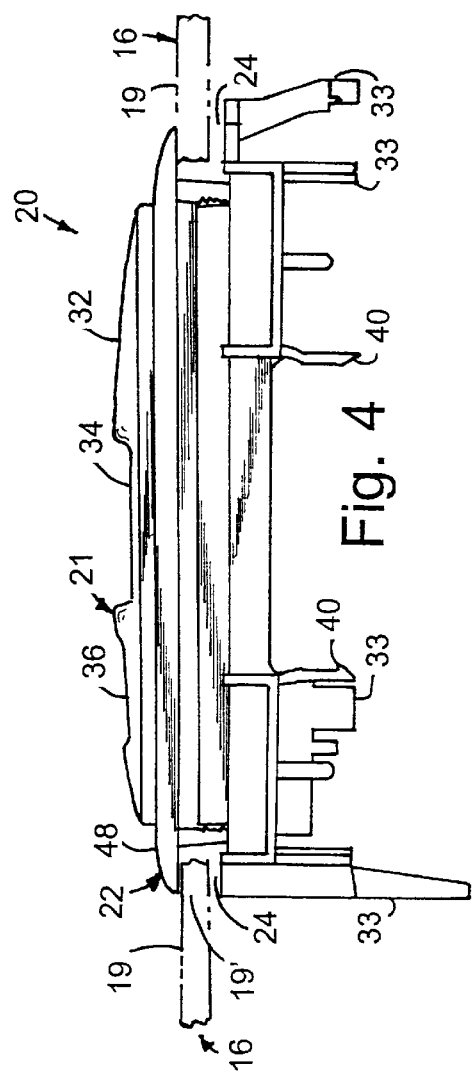

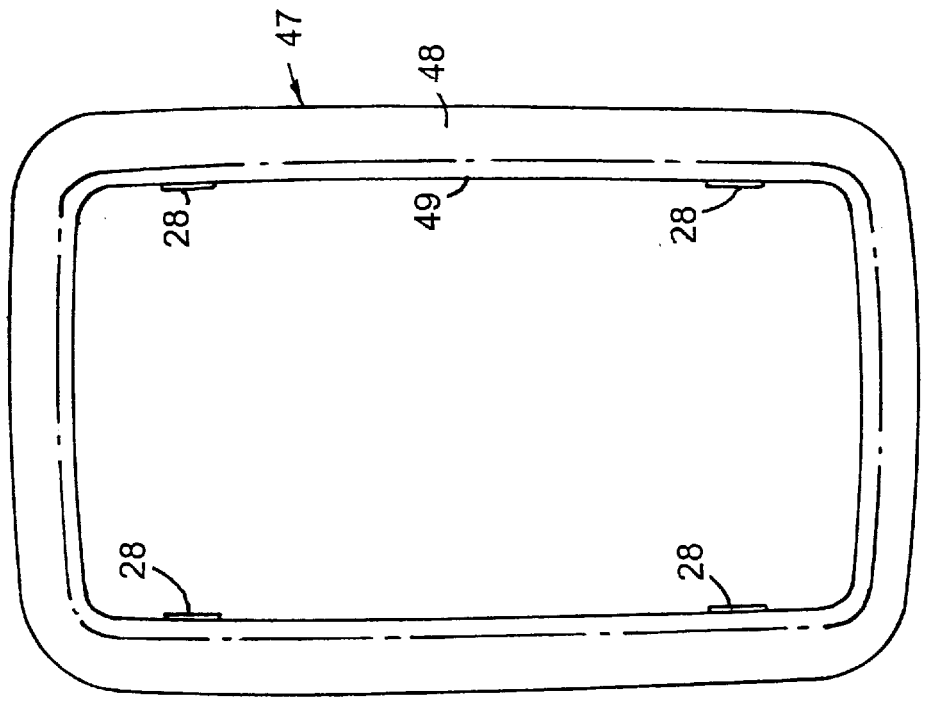
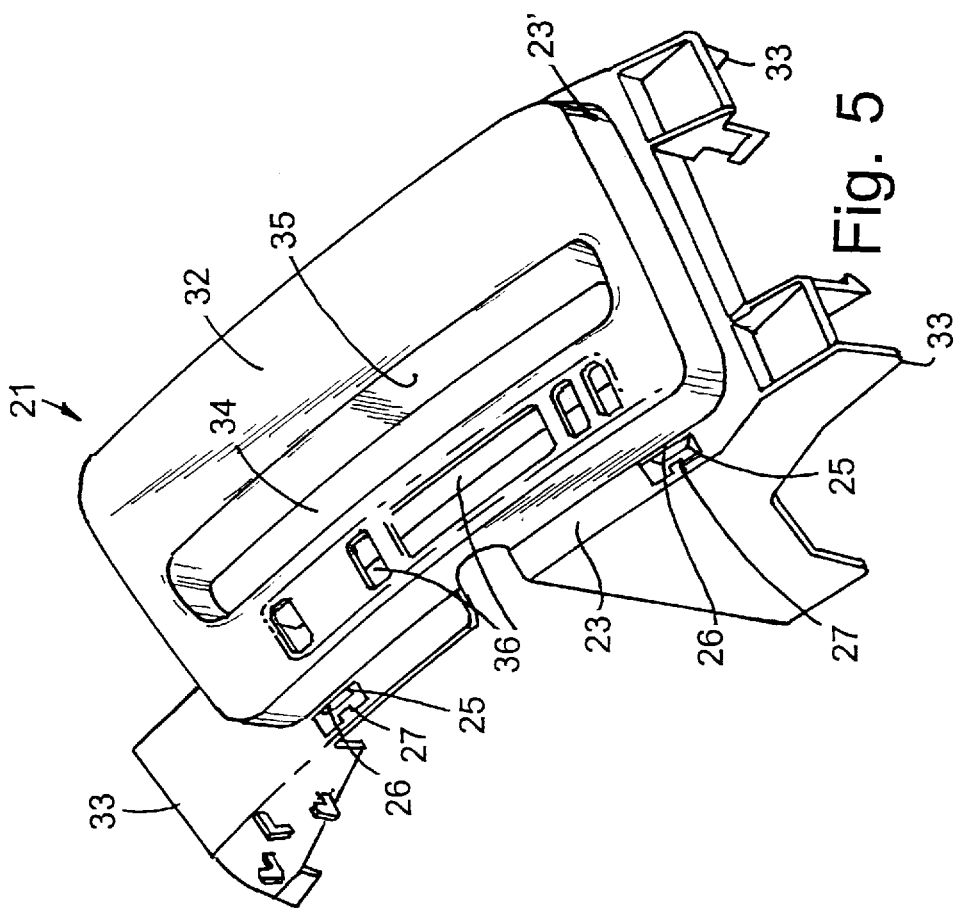

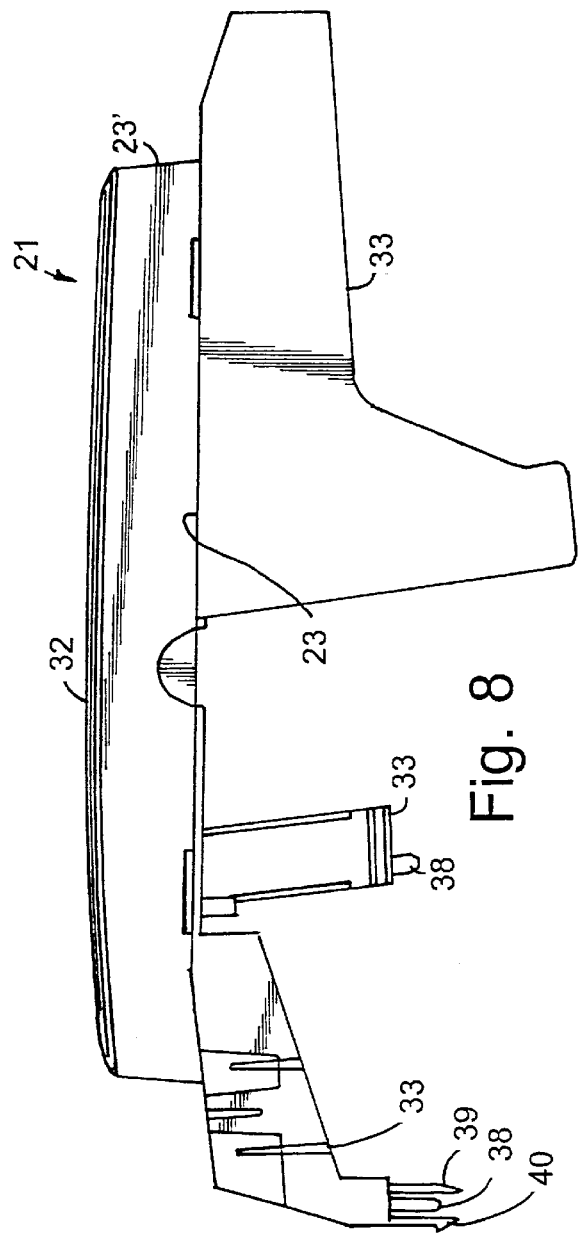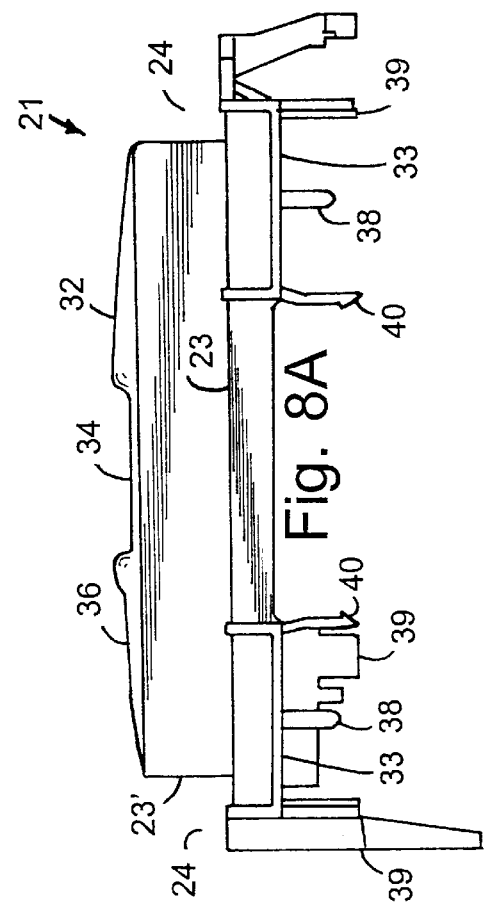

SHIFTER COVER ARRANGEMENT

BACKGROUND OF THE INVENTION

The present invention includes a shifter cover arrangement configured to permit secure assembly onto a shifter or console despite build variations, and to permit repeated disassembly/removal of the cover arrangement to allow access/repair to the shifter without adversely affecting retention strength.

Vehicles commonly include cover arrangement including covers, bezels, boots and the like that cover the visually unattractive areas at the top of a transmission shifter. Typically, the cover arrangements extend around a shift lever post on the shifter, such that only the upper end and handle of the shift lever can be seen. The covers may also include shift lever indicators for indicating the gear position of the shifter. A problem exists when the shifter needs to be accessed or repaired, because not only does the shifter cover arrangement prevent visual access to the bottom portion of the shifter, but it also blocks/prevents physical access. For example, one reason to remove cover panels is to access a park lock system or brake-ignition-transmission-shift-interlock (BITSI) systems often used on modern vehicle shifters. Most cover arrangements can be removed at least once, however the cover arrangements often wear out or become loose after multiple disassemblies and re-assemblies. This is especially true for cover arrangements that include polymeric bosses for receiving screws, because the screws strip out after multiple installations. It is also true of snap attach cover systems where the spring clips in the snap attachment systems may become damaged, lost, or deformed. If the spring clips are made of spring steel, they may rattle or buzz. Notably, both screw-type and spring-clip-type attachment systems use extra pieces that must be manipulated during assembly, and that can become lost or deformed during assembly, thus undesirably adding to the expense of the system.

Another problem is build variations. As a shifter, a console, and other bracketry is installed in a vehicle, the tolerances of each part can lead to significant vertical build variation between the top of the shifter and the top of the console housing the shifter. This leads to problems because the cover arrangement must bridge and cover the space between the shift lever post and the opening in the console for receiving the shift lever post. Many cover arrangements cannot accommodate too great of a vertical build variation without appearing to be distorted or misassembled. Other cover arrangements, such as snap together arrangements, have a further problem in that the strength of their retention system is adversely affected if the vertical build variation is too large. For example, if the console top surface is too high relative to the shifter, a snap together fastening system may not engage at all, leaving the covers loose. Conversely, if the console top surface is too low relative to the shifter, the snap together fastening system may securely retain the covers, but the covers are loosely retained and can rattle or slide laterally out of position. Even if the cover systems are adapted to accommodate some build variation, their retention strength varies considerably depending on their depth of engagement, thus leading to some assemblies having a poor retention force while others have too stiff of retention force. In other words, even if a particular cover retention system is able to accommodate some vertical build variation, known cover retention systems do not provide a constant retention strength for all expected vertical build variations. Snap-attach cover systems further often cannot be easily disassembled, or may break upon disassembly, such that they cannot be reused.

Accordingly, an apparatus solving the aforementioned problems is earnestly desired.

SUMMARY OF THE INVENTION

In one aspect, the present invention includes a cover arrangement for covering a transmission shifter for a vehicle including a lower cover member adapted to generally cover a transmission shifter while permitting movement of a shift lever on the transmission shifter. The lower cover member has visually unattractive areas and also has first connectors in the visually unattractive areas. An upper cover is constructed to mateably cover the visually unattractive areas, and further has second connectors arranged to engage the first connectors. One of the first and second connectors has apertures, each aperture being defined by marginal material having a tooth on one side and a pressure tab on another side. The other of the first and second connectors has protrusions shaped to extend into the apertures. In particular, each protrusion has a rough surface on one side for engaging the tooth of the aperture corresponding thereto, and has a relatively smooth surface on another side for slidably engaging the pressure tab of the aperture corresponding thereto, the rough surface and the smooth surface being substantially parallel. Each respective protrusion, pressure tab and tooth are related and configured so that the respective pressure tab presses the respective protrusion into engagement with the respective tooth with a predetermined constant force, thereby creating a desired force of engagement regardless of the depth of engagement of each respective protrusion into the respective aperture. This allows the upper cover to be installed on the bottom cover member without concern over the retention strength despite an uncertain depth of engagement.

In another aspect, a cover arrangement for covering a transmission shifter includes a lower cover member having unfinished areas and also having first connectors in the unfinished areas. A removable upper cover is constructed to mateably cover the unfinished areas, the upper cover having second connectors arranged to releasably engage the first connectors. One of the first and second connectors has apertures, each aperture being defined by marginal material having an angled inlet surface, an angled outlet surface, and a tooth extending laterally between the angled inlet and outlet surfaces. The other of the first and second connectors has protrusions shaped to extend into the apertures, each protrusion having a rough surface on one side for engaging the tooth of the aperture corresponding thereto. Each respective protrusion and corresponding tooth is related and configured so that the respective protrusion can be slid into and out of engagement with the respective tooth with a predetermined constant force and to a desired selected depth, whereby the upper cover can be repeatedly removed and re-installed on the bottom cover member without concern over unacceptable wear and cover damage.

In another aspect, a method of covering a vehicle shifter includes steps of providing a bottom cover member having visually unattractive areas and first connectors thereon located in the visually unattractive areas, and providing an upper cover shaped to cover the visually unattractive areas. The upper cover has second connectors arranged to engage the first connectors. The first and second connectors are configured to releasably engage at a variable depth and are configured to engage with a constant retention force regardless of the depth of engagement. The method further includes assembling the upper cover to a desired depth with the upper cover retained on the lower cover member with a known retention force, the desired depth being unknown at a time when the upper cover is provided.

In yet another aspect, a cover arrangement for covering a transmission shifter for a vehicle including a lower cover member constructed for attachment to a vehicle shifter, and an upper cover constructed to mateably engage an upper surface of the lower cover member to aesthetically cover the lower cover member, the upper cover member and the lower cover member including upper and lower connectors constructed to mateably engage with a constant force of engagement regardless of a depth of engagement of said upper and lower connectors.

These and other aspects of the present invention will become apparent to a person of ordinary skill in the art upon review of the description below, the claims, and the appended drawings.

DESCRIPTION OF DRAWINGS

FIGS. 2–4 are top, side and end views of the shifter arrangement shown in FIG. 1;

FIG. 5 is a perspective view of the lower cover shown in FIG. 1;

FIGS. 8 and 8A are left (driver) side and rear end views of the lower cover shown in FIG. 5;

FIGS. 9–11 are top, side and end views of the upper shifter shown in FIG. 1;

DETAILED DESCRIPTION OF PREFERRED EMBODIMENT

Figure 1:
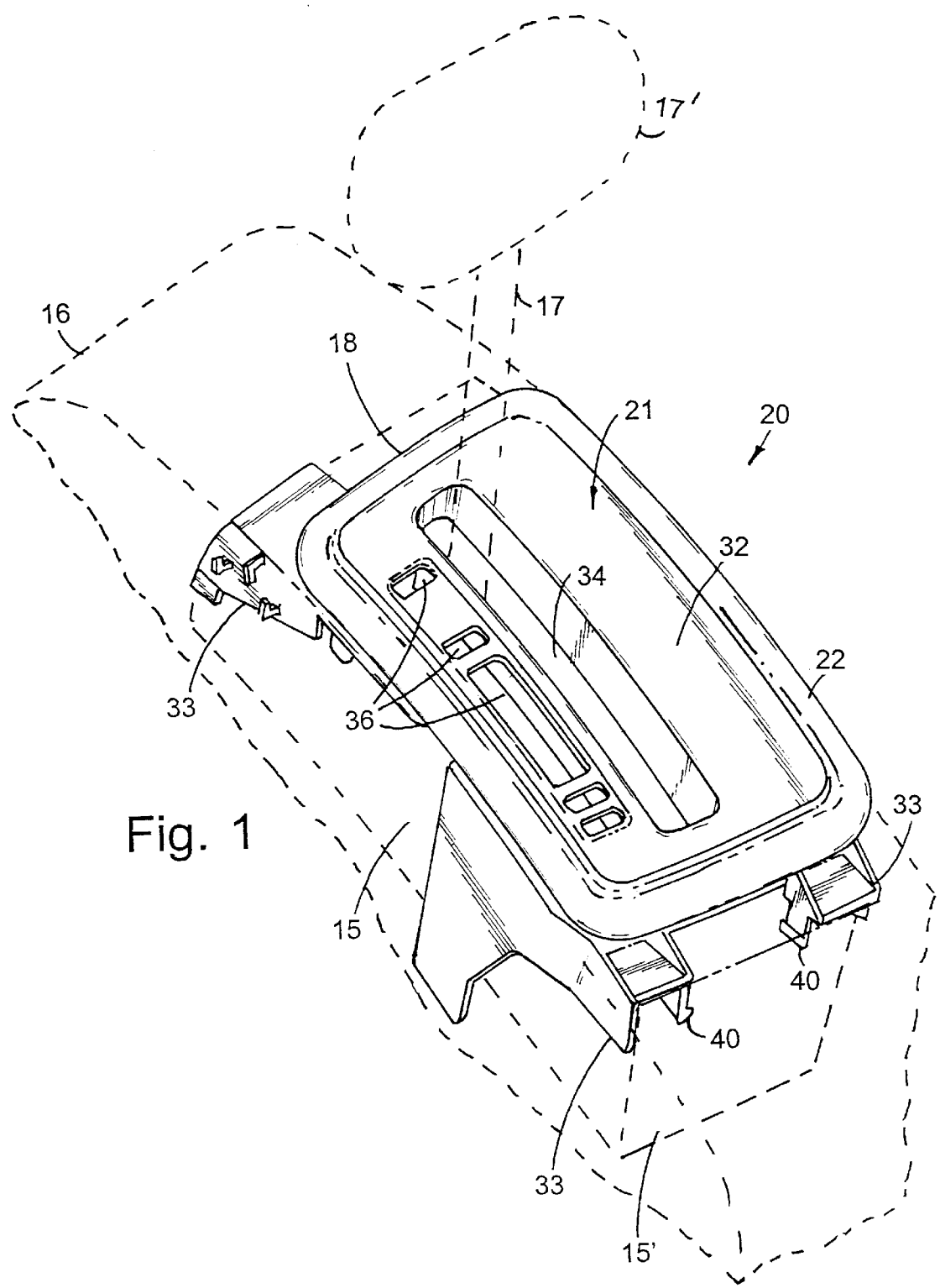
FIG. 1 is a perspective view showing a cover arrangement for shifters embodying the present invention, including a console shown in dashed lines.
Figure 2:
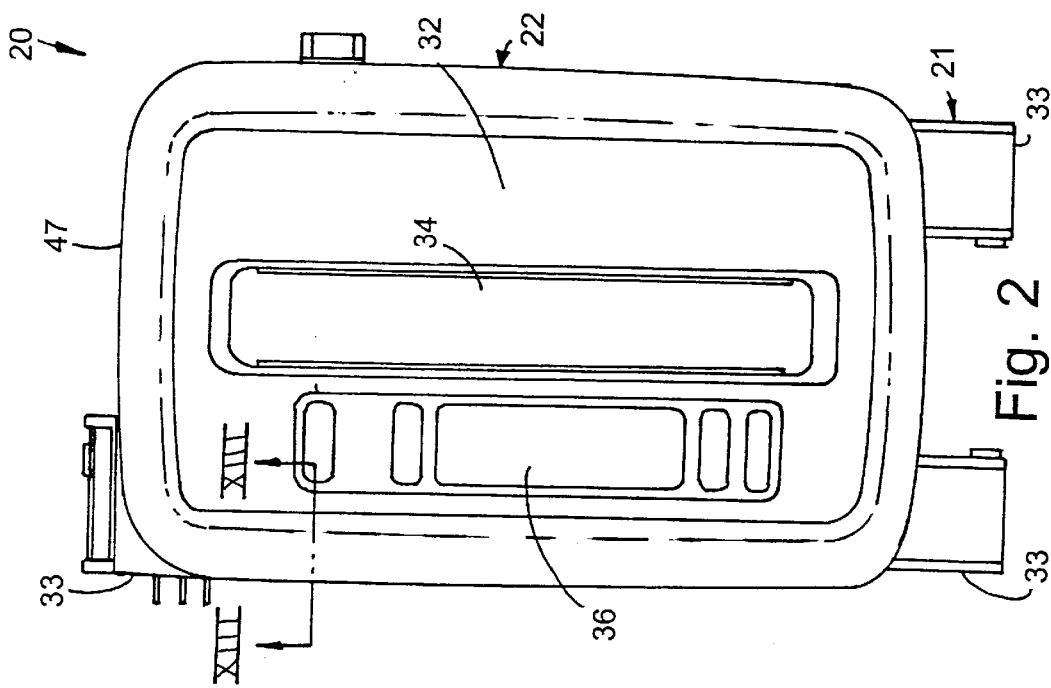

The present cover arrangement 20 (FIG. 1) is adapted to cover a transmission shifter 15 for a vehicle, despite build variations leading to uncertainty between the vertical height of an upper surface of a console 16 and the vertical height of the shifter 15. The cover arrangement 20 includes a lower cover member 21 and a ring shaped 22. The lower cover member 21 is adapted for snap attachment to a base 15' of the shifter 15 generally in the center of a vertical opening 18 in the console 16. The shift lever post 17 extends upwardly through opening 18 to a location where a vehicle driver can grasp a shift lever handle 17' and manipulate the shift lever post 17. The upper cover 22 is configured to releasably attach to the lower cover 21 to aesthetically cover unattractive areas of lower cover member 21 and to closeout the vertical opening 18 in the console, as discussed below. The connectors of upper cover 22 engage the connectors of lower cover member 21 with a predetermined force over a wide range of about ½ inch, despite build variations that cause variation in the depth of the engagement from vehicle to vehicle. This allows the upper cover 22 to acceptably accommodate significant vertical variation in the height of the console 16 and the height of the shifter 15.

Figure 6:
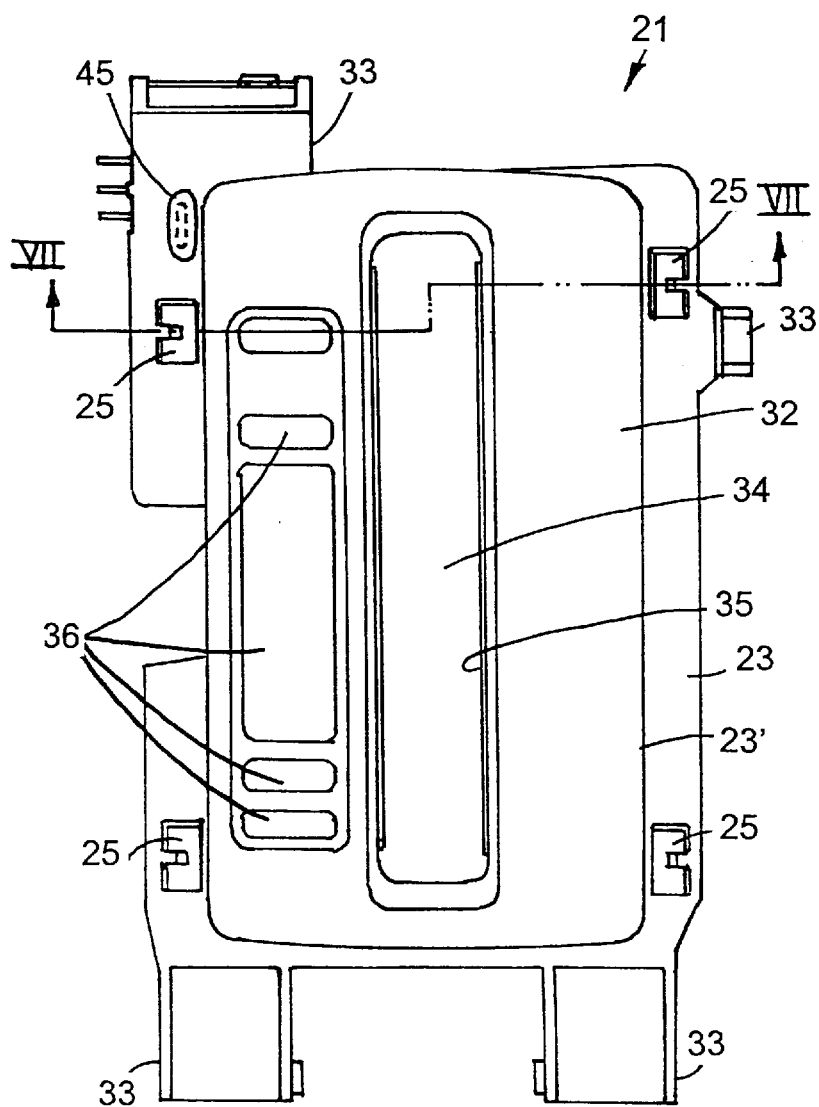
FIG. 6 is a top view of the lower cover shown in FIG. 5.
Figure 7:
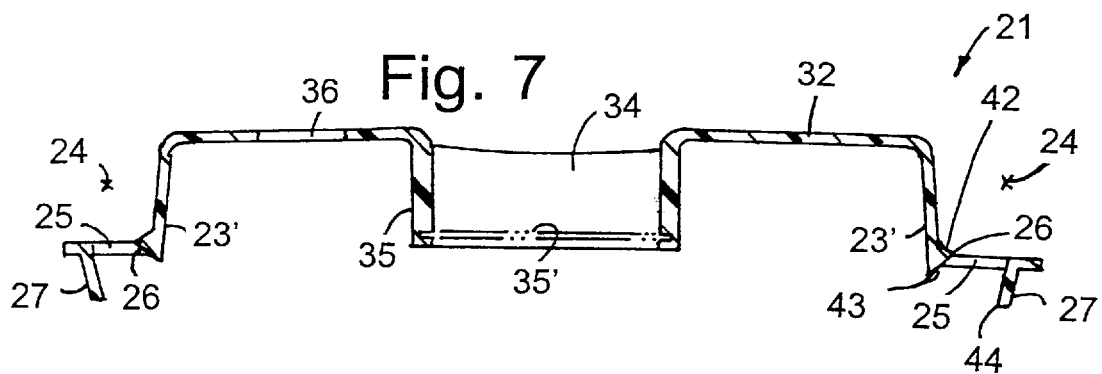
FIG. 7 is a cross section taken along the line VII—VII in FIG. 6.
Figure 10:
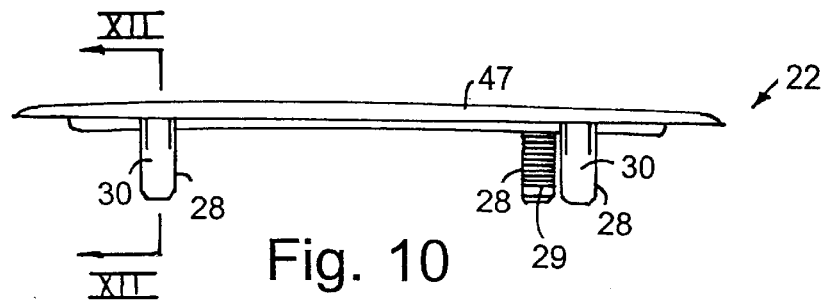

Lower cover member 21 (FIG. 6) includes a rectangularly shaped central plate 32. A slot 34 is formed generally in the center of plate 32 for receiving the shift lever post 17. Flanges 35 (FIG. 7) extend around the slot 34 for providing depth to the slot to limit visual access through the slot, and to stiffen plate 32. A closeout flap 35' or slidable tape can be placed in slot 34 to further prevent visual access into the shifter 20 through the slot 34. A series of openings 36 (FIG. 6) are located in the plate 32 in a row beside the slot 34. A shift lever position indicator (not specifically shown) is positioned below openings 36 and includes symbols/indicia for indicating the park gear position through the various openings 36, such as gear positions park, reverse, neutral, drive and the like.

The lower cover member 21 (FIG. 6) has a perimeter shelf 23 with an L-shaped cross section (FIG. 7) that forms an outwardly facing recess 24 around central plate 32. The perimeter shelf 23 includes a plurality of integrally formed apertures 25 each having a tooth 26 on one side and a pressure tab 27 on the other side. A plurality of downwardly-extending mounting flanges 33 (FIG. 6) are located on perimeter shelf 23, generally at its four corners. A sleeve-like perimeter flange or skirt 23' connects shelf 23 to central plate 32. The mounting flanges 33 include locator pins 38 (FIGS. 8 and 8A), installation alignment flanges or guides 39, and hooked fastener tabs 40. These features 33 and 38–40 are configured to matingly snappingly engage corresponding structure on the base 15' of shifter 15. The mounting flanges 33 provide for quick but accurate fastenerless attachment of lower cover member 21 to the shifter base 15'. When console 16 is assembled to the vehicle, the marginal lip 19' (FIGS. 3 and 4) of console 16 forming an aperture to receive plate 32 of lower cover member 21 is positioned in recess 24.

Each of the apertures 25 (FIG. 6) of lower cover member 21 are preferably generally rectangular in shape, although it is contemplated that different shapes could be used. Teeth 26 include an angled inlet surface 42 and angled exit surface 43, which surfaces are angled at about 45°. The pressure tab 27 defines a finger extending at an angle of about 10° to 30° into the space below aperture 25. A tip 44 of pressure tab 27 is adapted to slidably engage the smooth surface 30 on protrusion 28. An aperture or BITSI release member/button 45 is provided on flange 23 (FIG. 6) that provides access to a park lock mechanism or brake-ignition-transmission-shift-interlock (BITSI) device, such as for a repair procedure, which release member 45 is visually covered by upper cover 22.

Figure 12:
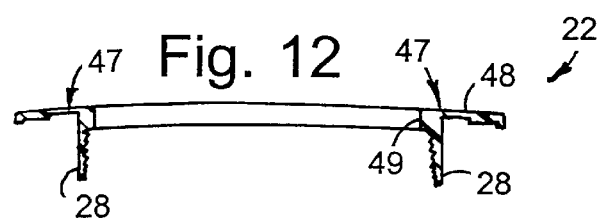
FIG. 12 is a cross section taken along the line XII—XII in FIG. 10.

Upper cover 22 (FIG. 9) includes a generally rectangularly shaped perimeter flange 47 (FIG. 12) having an L-shaped cross section. Flange 47 has a horizontal leg 48 and a vertical leg 49. The flange 47 (FIG. 9) includes rounded radiused corners and it is adapted to telescope into recess 24 of lower cover member 21 adjacent skirt flange 23' to aesthetically cover a perimeter of lower cover member 21. The upper cover 22 is configured to mate with the lower cover 21 in a sandwich-like arrangement, with portions of the upper cover 22 engaging the top surface 19 of lip 19'. The apertures 25 and irregular surfaces around recess 24 have a "rats nest" or cluttered appearance such that they are considered to be visually unattractive areas by most customers and persons in the art of vehicle interior design.

Thus, the arrangement of the cover 21 and 22 is designed to allow the upper cover 22 to abuttingly engage and trim out the upper surface 19 of the console 16 and lower cover 21 and to aesthetically closeout the opening 18 in the console 16.

Figure 1A:
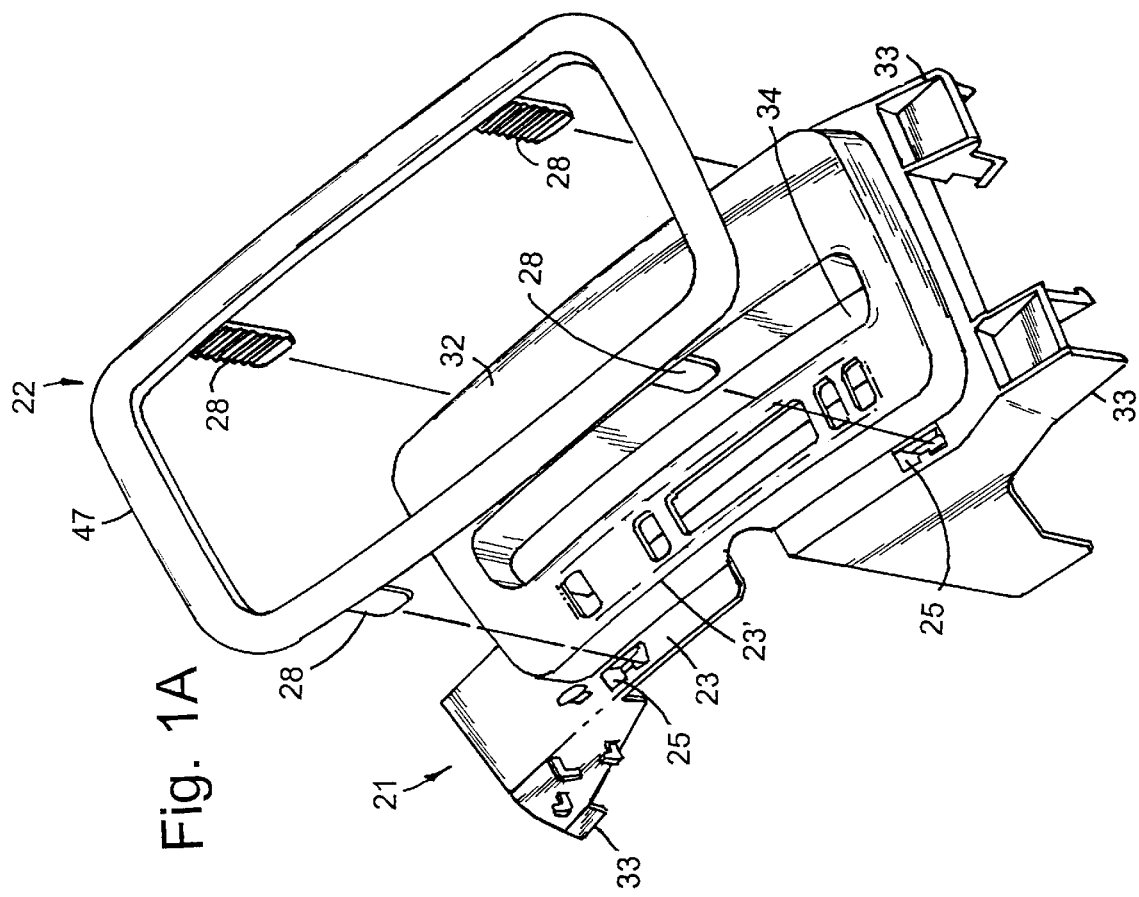
FIG. 1A is an exploded view showing the upper cover exploded away from the lower cover member.
Figure 11:
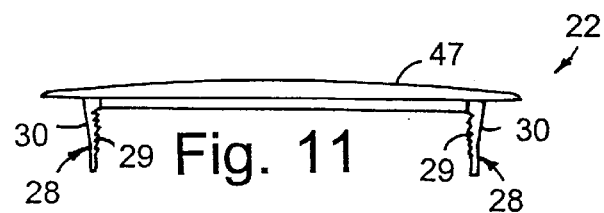
Figure 13:
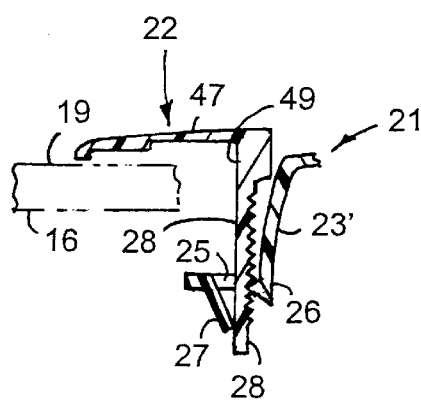
FIG. 13 is an enlarged cross section taken along the line XIII—XIII in FIG. 2, the upper cover being shown at a shallow depth of engagement.
Figure 14:
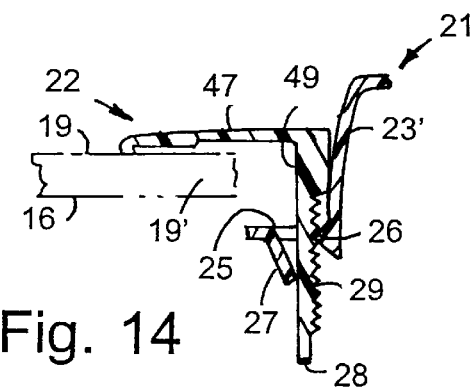
FIG. 14 is an enlarged cross section identical to FIG. 13, but with the upper cover being shown at a relatively deep depth of engagement.

The upper cover 22 (FIG. 1A) includes a plurality of integrally formed protrusions 28 shaped to extend into the apertures 25. Each protrusion 28 (FIG. 11) has a saw-tooth-shaped rough surface 29 on one side for engaging the tooth 26 of the aperture 25 corresponding thereto, and a relatively smooth surface 30 on its other side for slidably engaging the pressure tab 27 of the aperture 25 corresponding thereto. The rough surface 29 and the smooth surface 30 are substantially parallel, and their distance apart is chosen to be slightly larger than the horizontal space defined between the tip 44 of pressure tab 27 and the corresponding tooth 26. Specifically, each respective protrusion 28, pressure tab 27 and tooth 26 is related and configured so that the respective pressure tab 27 presses the respective protrusion 28 into engagement with the respective tooth 26 with a predetermined constant force, thereby creating a desired force of engagement regardless of the depth of engagement of each respective protrusion 28 into the respective aperture 26. Also, the upper cover 22 can be installed and reinstalled on the bottom cover member 21 without concern over the retention strength, depth of engagement, or wear, since the angled inlet and exit surfaces 42 and 43 allow for disengagement/release without substantial wear or breakage of parts. Viscous material can be used on the surfaces of teeth 26 and protrusions 28 to provide desired sliding frictional engagement if desired, although it is contemplated that the polymeric materials themselves will suffice. The angled surfaces and shape of the teeth 26 and protrusions 28 can also be changed to provide a semi-locking-type connection, although relatively sharply pointed teeth 26 and the corresponding sawtooth shaped rough surface 29 are believed to provide an excellent retention force, as shown in FIG. 13 (shallow engagement) and FIG. 14 (relatively deep engagement).

Notably, it is contemplated that the present cover arrangement can be used with a variety of different shifters, consoles, and structures in the interior of a vehicle. Also, in the illustrated embodiment, the connectors of the upper cover 22 are protrusions 28, and the connectors of lower cover member 21 are formed by a pattern of apertures 25 having teeth 26 on one side and a pressure tab 27 on the other side, although it is contemplated that the pressure tab could be incorporated into the protrusion 28 such as by making it a reversely extending flange of the tip of the protrusion 28.

In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. A cover arrangement for covering a transmission shifter for a vehicle, comprising:
 a lower cover member adapted for attachment to a vehicle to generally cover a transmission shifter while permitting movement of a shift lever on the transmission shifter, the lower cover member having visually unattractive areas and also having first connectors in the visually unattractive areas;
 an upper cover constructed to mateably cover the visually unattractive areas, the upper cover having second connectors arranged to engage the first connectors;
 one of the first and second connectors having apertures, each aperture being defined by marginal material having a tooth on one side and a pressure tab on another side;
 the other of the first and second connectors having protrusions shaped to extend into the apertures, each protrusion having a rough surface on one side for engaging the tooth of the aperture corresponding thereto, and having a relatively smooth surface on another side for slidably engaging the pressure tab of the aperture corresponding thereto, the rough surface and the smooth surface being substantially parallel;
 each respective protrusion, pressure tab and tooth being related and configured so that the respective pressure tab presses the respective protrusion into engagement with the respective tooth with a predetermined constant force, thereby creating a desired force of engagement regardless of the depth of engagement of each respective protrusion into the respective aperture, whereby the upper cover can be installed on the bottom cover member without concern over the retention strength or depth of engagement.

2. The cover arrangement defined in claim 1 wherein the protrusion is integrally molded as part of the upper cover.

3. The cover arrangement defined in claim 2 wherein the tooth is integrally molded as part of the lower cover member.

4. The cover arrangement defined in claim 3 wherein the pressure tab is integrally molded as part of the lower cover.

5. The cover arrangement defined in claim 4 wherein the rough surface and the smooth surface are generally parallel.

6. The cover arrangement defined in claim 5 wherein the rough surface includes a plurality of teeth forming a rack.

7. The cover arrangement defined in claim 6 wherein the upper cover includes at least two of said protrusions, the protrusions being arranged to prevent misassembly of the upper cover onto the lower cover member.

8. The cover arrangement defined in claim 1 wherein the upper cover includes a ring shaped flange that is adapted to engage and cover edges of an opening in a top surface of a console.

9. The cover arrangement defined in claim 1 wherein the lower cover member defines a perimeter recess and the upper cover is ring shaped and adapted to fit mateably into the perimeter recess.

10. The cover arrangement defined in claim 1 including an additional protrusion on one of the first and second connectors, the first mentioned protrusion and the additional protrusion being arranged to prevent misassembly of the upper cover onto the lower cover member.

11. The cover arrangement defined in claim 1 wherein the lower cover member defines an access opening for accessing a lower portion of the shifter, and wherein the upper cover covers the access opening.

12. The cover arrangement defined in claim 1 wherein the protrusions define an installation direction, and the upper cover and the lower cover include mating surfaces that extend parallel to the installation direction with small clearance therebetween so that any gap between the mating surfaces is known despite the depth of engagement of the upper cover on the lower cover member.

13. The cover arrangement defined in claim 1 wherein the lower cover member is constructed to snap attach to the vehicle.

14. The cover arrangement defined in claim 1 wherein the lower cover member includes an elongated slot for receiving a shift lever post, and further includes secondary openings for providing visual access to a shift lever position indicator.

15. The cover arrangement defined in claim 1 wherein each protrusion is integrally molded with the upper cover and comprises a homogenous material with the upper cover.

16. The cover arrangement defined in claim 1 wherein the teeth each include an angled inlet surface and an angled exit surface opposite the inlet surface to facilitate assembly of the upper cover onto the lower cover member, and further to facilitate depth adjustment of the upper cover on the lower cover member.

17. The cover arrangement defined in claim 1 wherein the first and second connectors are constructed to provide a uniform force of retention over a distance of at least one-quarter inch.

18. The cover arrangement defined in claim 17 wherein the depth adjustment distance is at least one-half inch.

19. A cover arrangement for covering a transmission shifter for a vehicle, comprising:

a lower cover member adapted for attachment to a vehicle to generally cover a transmission shifter while permitting limited movement of a shift lever on the transmission shifter, the lower cover member having unfinished areas and also having first connectors in the unfinished areas;

a removable upper cover constructed to mateably cover the unfinished areas, the upper cover having second connectors arranged to releasably engage the first connectors;

one of the first and second connectors having apertures, each aperture being defined by marginal material having an angled inlet surface, an angled outlet surface, and a tooth extending laterally between the angled inlet and outlet surfaces;

the other of the first and second connectors having protrusions shaped to extend into the apertures, each protrusion having a rough surface on one side for engaging the tooth of the aperture corresponding thereto; each respective protrusion and tooth being related and configured so that the respective protrusion can be slid into and out of engagement with the respective tooth with a predetermined constant force and to a desired selected depth, whereby the upper cover can be repeatedly removed and re-installed on the bottom cover member without concern over wear and cover damage.

20. The cover arrangement defined in claim 19 wherein the angled inlet surface and the angled outlet surface defined opposing angles of about 45°.

21. The cover arrangement defined in claim 20 wherein the lower cover member is constructed to snap attach to a vehicle component.

22. The cover arrangement defined in claim 19 wherein one of the first and second connectors includes a pressure tab extending at an angle into respective ones of the apertures, the pressure tab being configured to press on the respective protrusion extended into the respective apertures to provide a constant force.

23. The cover arrangement defined in claim 19 wherein the rough surface includes a plurality of teeth forming a rack.

24. The cover arrangement defined in claim 19 wherein the upper cover is ring shaped and wherein the lower cover member includes a perimeter recess for receiving the upper cover.

25. The cover arrangement defined in claim 19 wherein the lower cover member includes one of an access opening and a park lock release mechanism, and wherein the upper cover is configured to cover the one of the access opening and the park lock release mechanism.

26. The cover arrangement defined in claim 19 wherein the first and second connectors are configured to provide adjustable engagement that is adjustable to a distance of at least one-quarter inch while maintaining a constant force.

27. A method of covering a vehicle shifter comprising steps of:

providing a lower cover member having visually unattractive areas and first connectors thereon located in the visually unattractive areas;

providing an upper cover shaped to cover the visually unattractive areas, the upper cover having second connectors arranged to engage the first connectors, the first and second connectors including a protrusion and an apertured flange for receiving the protrusion, and one of the connectors further including a resilient pressure tab for biasing the protrusion against the apertured flange, the first and second connectors being configured to releasably engage at a variable depth and being configured to engage with a constant retention force regardless of the depth of engagement; and assembling the upper cover to a desired depth with the upper cover retained on the lower cover member with a known retention force and located at an adjusted depth, the desired depth being unknown at a time when the upper cover is provided.

28. The method defined in claim 27 including steps of removing and reinstalling the upper cover on the lower cover at least about twenty times without substantially affecting the retention force.

29. The method defined in claim 28 wherein the first and second connectors are integrally molded of homogeneous material with their respective upper cover and lower cover member.

30. The method defined in claim 27 including steps of releasably snap attaching the lower cover member to a vehicle component.

31. A cover arrangement for covering a transmission shifter for a vehicle, comprising:

a lower cover member constructed for attachment to a vehicle shifter; and an upper cover member constructed to mateably engage an upper surface of the lower cover member to aesthetically cover the lower cover member, the upper cover being substantially ring-shaped and adapted to receive a shift lever extended upwardly through a center thereof, the upper cover member and the lower cover member including upper and lower connectors constructed to mateably engage with a constant force of engagement regardless of depth of engagement of said upper and lower connectors, the upper connectors being spaced around the ring-shaped upper cover member to hold opposing sides of the upper cover at a selected depth, wherein each of the upper and lower connectors include a protrusion and an apertured flange for receiving the protrusion, one of the protrusion and the apertured flange including a pressure tab for pressing the protrusion into engagement with the apertured flange with a predetermined force regardless of a depth of engagement of the protrusion with the apertured flange.

* * * * *